US012604146B2

(12) United States Patent
Park et al.

(10) Patent No.: US 12,604,146 B2
(45) Date of Patent: Apr. 14, 2026

(54) BEAMFORMING DEVICE

(71) Applicant: mpWAV Inc., Seoul (KR)

(72) Inventors: Hyung Min Park, Seoul (KR); Byung Joon Cho, Seoul (KR)

(73) Assignee: mpWAV Inc., Seoul (KR)

( * ) Notice: Subject to any disclaimer, the term of this patent is extended or adjusted under 35 U.S.C. 154(b) by 104 days.

(21) Appl. No.: 18/539,276

(22) Filed: Dec. 14, 2023

(65) Prior Publication Data

US 2024/0365072 A1 Oct. 31, 2024

(30) Foreign Application Priority Data

Apr. 28, 2023 (KR) ........................ 10-2023-0055999

(51) Int. Cl.
*H04R 25/00* (2006.01)

(52) U.S. Cl.
CPC ......... *H04R 25/407* (2013.01); *H04R 25/405* (2013.01)

(58) Field of Classification Search
CPC .... H04R 25/407; H04R 25/405; H04R 3/005; H04R 2203/12; H04R 2430/20; G10L 25/78; G10L 2021/02166; G10L 21/0216; G10K 11/34; G10K 2210/3215
USPC ........................................... 381/313; 367/119
See application file for complete search history.

(56) References Cited

U.S. PATENT DOCUMENTS

2006/0291596 A1* 12/2006 Piirainen .............. H04B 17/373 375/346
2023/0239616 A1* 7/2023 Nakatani ................ G06N 3/084 381/73.1

FOREIGN PATENT DOCUMENTS

CN 114648999 A * 6/2022 ......... G10L 21/0216
KR 1020040094300 A 11/2004
KR 10-1133308 B1 4/2012

OTHER PUBLICATIONS

Cho et al. (Convolutional Maximum-Likelihood Distortionless Response Beamforming With Steering Vector Estimation for Robust Speech Recognition—IEEE/ACM Transactions on Audio, Speech, and Language Processing—pp. 1352-1367—Mar. 18, 2021) (Year: 2021).*

(Continued)

*Primary Examiner* — Duc Nguyen
*Assistant Examiner* — Chimezie Ezeriwe Bekee
(74) *Attorney, Agent, or Firm* — ArentFox Schiff LLP; Yun H. Choe

(57) ABSTRACT

A beamforming device in the present invention includes a probability estimation unit, a steering vector unit, and a beamforming unit, wherein the probability estimation unit estimates a speech existence probability corresponding to a probability that a target speech signal exists based on an input vector; the steering vector unit provides an estimated steering vector according to the speech existence probability and an input vector; and the beamforming unit calculates a weight vector based on the speech existence probability, the input vector, and the estimated steering vector to provide an output vector, and the beamforming device of the present invention can more accurately extract the target speech signal from the input signal by estimating the speech existence probability corresponding to the probability that the target speech signal exists based on the input vector to provide the steering vector and the weight vector.

12 Claims, 8 Drawing Sheets

100

(56) References Cited

OTHER PUBLICATIONS

Byung Joon CHO et al., Convolutional Maximum-Likelihood Distortionless Response Beamforming With Steering Vector Estimation for Robust Speech Recognition, IEEE/ACM Transactions on audio, speech, and language processing, Mar. 18, 2021, vol. 29.

* cited by examiner

FIG. 6

$$\overline{\mathbf{X}}_{m,t,f} = \begin{bmatrix} X_{m,t-N_t,f+N_f} & \cdots & X_{m,t,f+N_f} \\ \vdots & \vdots & \vdots \\ X_{m,t-N_t,f} & \cdots & X_{m,t,f} \\ \vdots & \vdots & \vdots \\ X_{m,t-N_t,f-N_f} & \cdots & X_{m,t,f-N_f} \end{bmatrix}$$

FIG. 7

$\overline{\mathbf{X}}_{t,f}$

| | | | | |
|---|---|---|---|---|
| $X_{m,t-4,f+2}$ | $X_{m,t-3,f+2}$ | $X_{m,t-2,f+2}$ | $X_{m,t-1,f+2}$ | $X_{m,t,f+2}$ |
| $X_{m,t-4,f+1}$ | $X_{m,t-3,f+1}$ | $X_{m,t-2,f+1}$ | $X_{m,t-1,f+1}$ | $X_{m,t,f+1}$ |
| $X_{m,t-4,f}$ | $X_{m,t-3,f}$ | $X_{m,t-2,f}$ | $X_{m,t-1,f}$ | $X_{m,t,f}$ |
| $X_{m,t-4,f-1}$ | $X_{m,t-3,f-1}$ | $X_{m,t-2,f-1}$ | $X_{m,t-1,f-1}$ | $X_{m,t,f-1}$ |
| $X_{m,t-4,f-2}$ | $X_{m,t-3,f-2}$ | $X_{m,t-2,f-2}$ | $X_{m,t-1,f-2}$ | $X_{m,t,f-2}$ |

BEAMFORMING DEVICE

CROSS-REFERENCE TO RELATED APPLICATION

This application claims benefit of priority to Korean Patent Application No. 10-2023-0055999 filed Apr. 28, 2023, the contents of which is incorporated herein by reference in its entirety.

FIELD

The present invention relates to a beamforming device.

BACKGROUND

A sound input signal input through a microphone may include not only a target speech required for speech recognition but also noise that interferes with speech recognition. Various researches are being conducted to improve the performance of the speech recognition by removing noise from the sound input signal and extracting only the desired target speech.

SUMMARY

The present invention provides a beamforming device capable of more accurately extracting a target speech signal from an input signal by estimating a speech existence probability corresponding to a probability that the target speech signal exists based on an input vector to provide a steering vector and a weight vector.

According to an embodiment of the present invention, a beamforming device may include a probability estimation unit, a steering vector unit, and a beamforming unit. The probability estimation unit may estimate a speech existence probability corresponding to a probability that a target speech signal exists based on an input vector. The steering vector unit may provide an estimated steering vector according to the speech existence probability and the input vector. The beamforming unit may calculate a weight vector based on the speech existence probability, the input vector, and the estimated steering vector to provide an output vector.

In an embodiment, the speech existence probability may be determined according to a target speech signal spatial covariance matrix for the target speech signal included in the input vector.

In an embodiment, the target speech signal spatial covariance matrix for the target speech signal included in the input vector may be calculated according to a noise spatial covariance matrix.

In an embodiment, the noise spatial covariance matrix for noise included in the input vector may be calculated according to a noise spatial covariance matrix estimate of a previous frame corresponding to the previous frame of a current frame.

In an embodiment, a noise spatial covariance inverse matrix for the noise included in the input vector may be calculated according to a variance-weighted spatial covariance inverse matrix in the previous frame.

In an embodiment, an estimated time-varying variance included in the noise spatial covariance inverse matrix is calculated by weighted-averaging a time-varying variance in the previous frame.

In an embodiment, the beamforming device may further include a probability providing unit. The probability providing unit may provide the speech existence probability based on the target speech signal spatial covariance matrix.

In an embodiment, the beamforming device may further include a mask unit. The mask unit may provide a target speech mask according to the speech existence probability.

In an embodiment, the estimated steering vector may be determined according to a re-estimated time-varying variance calculated based on the target speech mask.

In an embodiment, the weight vector may be determined according to the re-estimated time-varying variance calculated based on the target speech mask.

In an embodiment, the variance-weighted spatial covariance inverse matrix may be determined according to the re-estimated time-varying variance calculated based on the target speech mask.

In an embodiment, the time-varying variance may be determined according to power of an output signal calculated based on the target speech mask.

In an embodiment, the beamforming device may further include a determination unit. The determination unit may determine whether a diagonal component of the target speech signal spatial covariance matrix estimate is a negative number.

In an embodiment, when the diagonal component of the target speech signal spatial covariance matrix estimate is the negative number, the target speech mask of the current frame may be the same as the target speech mask of the previous frame, and the estimated steering vector of the current frame may be the same as the estimated steering vector of the previous frame.

In an embodiment, when the beamforming device operates in a single channel, the input vector may be configured by changing the frame and frequency based on the current frame and a reference frequency.

In an embodiment, the input vector may be composed of a portion of the input vector.

In addition to the technical problems of the present invention described above, other features and advantages of the present invention will be described below, or may be clearly understood by those skilled in the art from such description and explanation.

BRIEF DESCRIPTION OF DRAWINGS

FIGS. 6 to 8 are diagrams for describing an input vector in a single channel applied to the beamforming device of FIG. 2.

DETAILED DESCRIPTION

Figure 1:
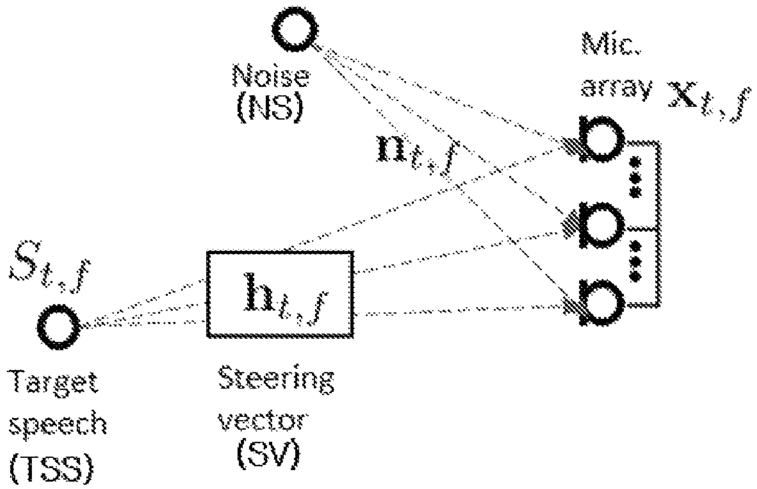
FIGS. 1 and 2 are diagrams for describing a beamforming device according to embodiments of the present invention.

In the specification, in adding reference numerals to components throughout the drawings, it is to be noted that like reference numerals designate like components even though components are shown in different drawings.

On the other hand, the meaning of the terms described in the present specification should be understood as follows.

Singular expressions should be understood as including plural expressions, unless the context clearly defines otherwise, and the scope of rights should not be limited by these terms.

Also, it should be understood that terms such as "include" and "have" do not preclude the existence or addition possibility of one or more other features or numbers, steps, operations, components, parts, or combinations thereof.

Hereinafter, preferred embodiments of the present invention designed to solve the above problems will be described in detail with reference to the accompanying drawings.

Figure 2:
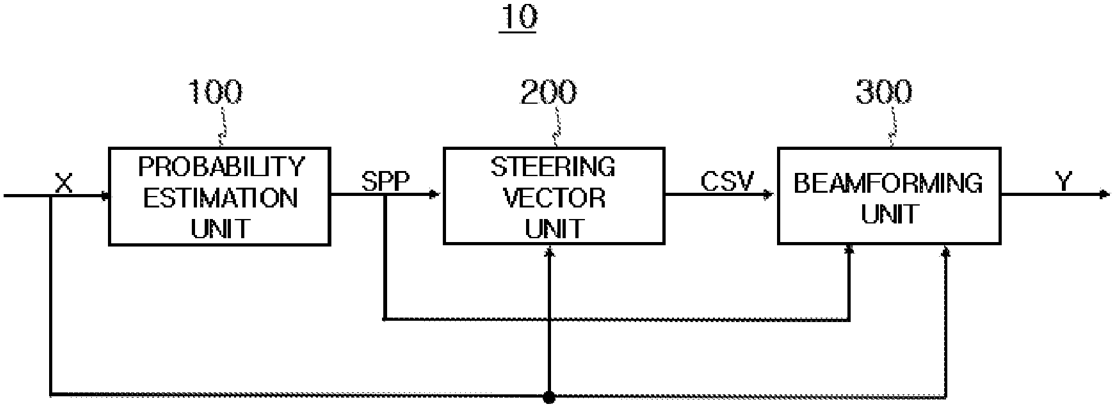

FIGS. 1 and 2 are diagrams for describing a beamforming device according to embodiments of the present invention.

Referring to FIGS. 1 and 2, a beamforming device 10 according to an embodiment of the present invention may include a probability estimation unit 100, a steering vector unit 200, and a beamforming unit 300. The probability estimation unit 100 may estimate a speech existence probability SPP corresponding to a probability that a target speech signal TSS exists based on an input vector X. For example, the target speech signal may be provided as a microphone input through a space (transfer function, steering vector) between a target speech and a microphone, and the microphone input may include noise. Here, the microphone input may be the input vector X according to the present invention.

In addition, the speech existence probability (SPP) may be defined as a posterior probability of the existence of the target speech signal TSS in the input vector X at time t and frequency f, and may be expressed as [Equation 1] below using a Bayes rule.

$$p_{t,f} = P\left(H_{t,f}^{(s)} \mid x_{t,f}\right) = \left(1 + \frac{1}{\Lambda_{t,f}}\right)^{-1} \quad \text{[Equation 1]}$$

Here, $p_{t,f}$ may be the speech existence probability, $$P\left(H_{t,f}^{(s)} \mid x_{t,f}\right)$$

may be a posterior probability for when the target speech signal exists in the input vector, and $\Lambda_{t,f}$ may be a generalized likelihood ratio. The generalized likelihood ratio may be expressed as [Equation 2] below.

$$\Lambda_{t,f} = \frac{1 - P\left(H_{t,f}^{(n)}\right)}{P\left(H_{t,f}^{(n)}\right)} \frac{p\left(x_{t,f} \mid H_{t,f}^{(s)}\right)}{p\left(x_{t,f} \mid H_{t,f}^{(n)}\right)} \quad \text{[Equation 2]}$$

Here, $$P\left(H_{t,f}^{(n)}\right)$$

may be a prior probability when there is no target speech signal and may be set to a constant between 0 and 1, $$p\left(x_{t,f} \mid H_{t,f}^{(s)}\right)$$

may be a likelihood of when the target speech signal existing in the input vector, and $$p\left(x_{t,f} \mid H_{t,f}^{(n)}\right)$$

may be the likelihood of when the target speech signal does not exist in the input vector.

According to an embodiment, the speech existence probability SPP may be determined according to a target speech signal spatial covariance matrix TGM for the target speech signal TSS included in the input vector X. Summarizing [Equation 1] above, it may be expressed as [Equation 3] below.

$$p_{t,f} = \left[1 + \frac{P\left(H_{t,f}^{(n)}\right)}{1 - P\left(H_{t,f}^{(n)}\right)}(1 + \xi_{t,f})\exp\left(-\frac{\mu_{t,f}}{1 + \xi_{t,f}}\right)\right]^{-1} \quad \begin{aligned} \xi_{t,f} &= tr\left((\underline{R}_{t,f}^{n})^{-1}\underline{R}_{t,f}^{s}\right) \\ \mu_{t,f} &= x_{t,f}^{H}(\underline{R}_{t,f}^{n})^{-1}\underline{R}_{t,f}^{s}(\underline{R}_{t,f}^{n})^{-1}x_{t,f} \end{aligned} \quad \text{[Equation 3]}$$

Here, $$\underline{R}_{t,f}^{n}$$

may be a noise spatial covariance matrix, and $$\underline{R}_{t,f}^{s}$$

may be the target speech signal spatial covariance matrix.

According to an embodiment, the target speech signal spatial covariance matrix TGM for the target speech signal TSS included in the input vector X may be calculated according to the noise spatial covariance matrix. For example, the target speech signal spatial covariance matrix TGM for the target speech signal (TSS) may be expressed as [Equation 4] below:

$$\underline{R}_{t,f}^{s} = R_{t,f}^{x} - \underline{R}_{t,f}^{n} \quad \text{[Equation 4]}$$

Here, $$\underline{R}_{t,f}^{s}$$

may be the target speech signal spatial covariance matrix, $$\underline{R}_{t,f}^{n}$$

may be the noise spatial covariance matrix, and $$R^x_{t,f}$$

may be the spatial covariance matrix for the input vector. The spatial covariance matrix for the input vector X may be expressed as [Equation 5] below.

$$R^x_{t,f} = \frac{1}{\sum_{l=1}^{t} \gamma^{t-1}} \sum_{t=1}^{t} \gamma^{t-1} x_{l,f} x^H_{l,f} = \frac{1}{\Gamma^t_{l,f}} \left( \gamma \Gamma^x_{t-1,f} R^x_{t-1,f} + x_{t,f} x^H_{t,f} \right) \qquad \Gamma^H_{t,f} = \sum_{t=1}^{t} \gamma^{t-1} = \gamma \Gamma^x_{t-1} + 1$$

[Equation 5]

Here, $x_{t,f}$ may be the input vector, $$R^x_{t-1,f}$$

may be the spatial covariance matrix for the input vector in the previous frame, $$\Gamma^x_{t,f}$$

may be a weight for normalizing the spatial covariance matrix for the input vector, and $\gamma$ may be a forgetting factor. Here, the forgetting factor may be a constant that may have a value between 0 and 1.

According to an embodiment, the noise spatial covariance matrix for noise included in the input vector X may be calculated according to the noise spatial covariance matrix estimate of the previous frame corresponding to the previous frame of the current frame. For example, the noise spatial covariance matrix may be expressed as [Equation 9] below.

$$R^n_{t,f} = \frac{1}{\hat{\Gamma}^n_{t,f}} \left( \gamma \Gamma^n_{t-1,f} R^n_{t-1,f} + \frac{x_{t,f} x^H_{t,f}}{\hat{\lambda}_{t,f}} \right) \qquad \text{[Equation 9]}$$

Here, $$R^n_{t-1,f}$$

may be the noise spatial covariance matrix estimate of the previous frame, $$\hat{\Gamma}^n_{t,f}$$

may be the estimated weight for normalizing the noise spatial covariance matrix, $$\Gamma^n_{t-1,f}$$

may be the weight for normalizing the noise spatial covariance matrix in the previous frame, $\hat{\lambda}_{t,f}$ may be the estimated time-varying variance, $x_{t,f}$ may be the input vector, and $\gamma$ may be the forgetting factor.

According to an embodiment, the noise spatial covariance inverse matrix for the noise included in the input vector X may be calculated according to the variance-weighted spatial covariance inverse matrix in the previous frame. For example, the noise spatial covariance inverse matrix may be expressed as [Equation 5] below.

$$\left(R^n_{t,f}\right)^{-1} = \frac{\hat{\Gamma}^n_{t,f}}{\gamma} \left( \Psi_{t-,f} - \frac{P_{t,f}}{\gamma \hat{\lambda}_{t,f} + Q_{t,f}} \right) \qquad \text{[Equation 5]}$$

Here, $$\Psi_{t-1,f}$$

may be the variance-weighted spatial covariance inverse matrix in the previous frame, $\hat{\lambda}_{t,f}$ may be the estimated time-varying variance, and $\gamma$ may be the forgetting factor.

$$\hat{\Gamma}^n_{t,f}$$

is the estimated weight for normalization of the noise spatial covariance matrix and may be expressed as [Equation 6] below.

$$\hat{\Gamma}^n_{t,f} = \gamma \Gamma^n_{t-1,f} + 1/\hat{\lambda}_{t,f} \qquad \text{[Equation 6]}$$

Here, $$\Gamma^n_{t-1,f}$$

may be a weight for normalizing the noise spatial covariance inverse matrix in the previous frame, $\hat{\lambda}_{t,f}$ may be the estimated time-varying variance, and $\gamma$ may be the forgetting factor.

According to an embodiment, the estimated time-varying variance included in the noise spatial covariance inverse matrix may be calculated by weighted-averaging the time-varying variance in the previous frame. For example, the estimated time-varying variance may be expressed as [Equation 7] below.

$$\hat{\lambda}_{t,f} = \max\left(\beta\lambda_{t-1,f} + (1-\beta)|\hat{Y}_{t,f}|^2, \epsilon_f\right) \quad \text{[Equation 7]}$$

Here, $\hat{\lambda}_{t,f}$ may be the estimated time-varying variance, $\lambda_{t-1,f}$ may be the time-varying variance in the previous frame, β may be a constant between 0 and 1, and $\epsilon_f$ may be a constant greater than 0. $|\hat{Y}_{t,f}|^2$ may be the power of the estimated output signal, and may be expressed as [Equation 8] below.

$$|\hat{Y}_{t,f}|^2 = \frac{1}{2N_f+1}\sum_{r=f-N_f}^{f+N_f} |w_{t-1,r}^H x_{t,r}|^2 \quad \text{[Equation 8]}$$

Here, $w_{t-1,r}$ may be the weight vector in the previous frame, (·)H may be the Hermitian transpose, and $N_f$ may be the number of adjacent frequencies. The number of adjacent frequencies may be a constant greater than zero.

Figure 3:
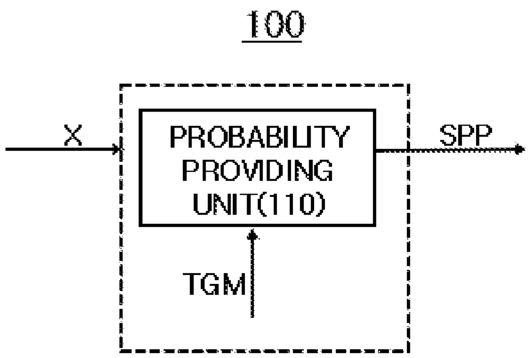
FIG. 3 is a diagram illustrating an example of a probability estimation unit included in the beamforming device of FIG. 2.
Figure 4:
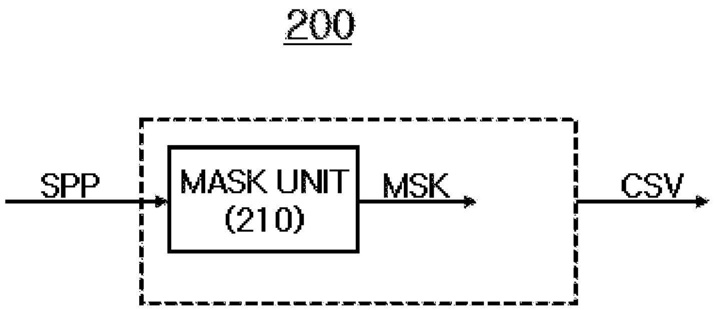
FIG. 4 is a diagram illustrating an example of a steering vector unit included in the beamforming device of FIG. 2.

FIG. 3 is a diagram illustrating an example of the probability estimation unit included in the beamforming device of FIG. 2, and FIG. 4 is a diagram illustrating an example of the steering vector unit included in the beamforming device of FIG. 2.

Referring to FIGS. 1 to 4, according to an embodiment, the beamforming device 10 may further include the probability providing unit 110. The probability providing unit 110 may provide the speech existence probability SPP based on the target speech signal spatial covariance matrix TGM.

In addition, according to an embodiment, the beamforming device 10 may further include a mask unit 210. The mask unit 210 may provide a target speech mask MSK according to the speech existence probability SPP. For example, when it is unclear whether it is the target speech signal TSS, the speech existence probability SPP may have a value around 0.5. In this case, to extract the frame t and frequency f where the target speech signal TSS clearly exists, the target speech mask MSK as illustrated in [Equation 9] below may be used.

$$\mathcal{M}_{t,f} = \begin{cases} p_{t,f}, & \text{if } p_{t,f} \geq \eta_k. \\ \epsilon_p, & \text{otherwise.} \end{cases} \quad \text{[Equation 9]}$$

Here, ηk may be a threshold value (e.g., 0.8) with a constant between 0 and 1, and $\epsilon_p$ may be a lower limit value (e.g., 0.1) with a constant between 0 and 1.

The steering vector unit 200 may provide an estimated steering vector CSV according to the speech existence probability SPP and the input vector X. In one embodiment, the estimated steering vector CSV may be determined according to the re-estimated time-varying variance calculated based on the target speech mask MSK. For example, the re-estimated time-varying variance may be expressed as [Equation 10] below.

$$\tilde{\lambda}_{t,f} = \max\left(\beta\lambda_{t-1,f} + (1-\beta)|\tilde{Y}_{t,f}|^2, \epsilon_f\right) \quad \text{[Equation 10]}$$

Here, $\tilde{\lambda}_{t,f}$ may be the re-estimated time-varying variance, $\lambda_{t-1,f}$ may be the time-varying variance in the previous frame, β may be a constant between 0 and 1, and $\epsilon_f$ may be a constant greater than 0. $|\tilde{Y}_{t,f}|^2$ may be the power of the re-estimated output signal, and may be expressed as [Equation 11] below.

$$\left|\tilde{Y}_{t,f}\right.^2 + \frac{1}{2N_f+1}\sum_{r=f-N_f}^{f+N_f} \left|\mathcal{M}_{t,r}\left(w_{t-1,r}^H x_{t,r}\right)\right|^2 \quad \text{[Equation 11]}$$

Here, $M_{t,r}$ may be the target speech mask. According to the re-estimated time-varying variance, the noise spatial covariance matrix estimate in the current frame may be expressed according to [Equation 12] below.

$$R_{t,f}^n = \frac{1}{\Gamma_{t,f}^n}1\left(\gamma\Gamma_{t-1,f}^n R_{t-1,f}^n + \frac{x_{t,f}x_{t,f}^H}{\tilde{\lambda}_{t,f}}\right) \quad \text{[Equation 12]}$$

Here, $$R_{t,f}^n$$

may be the noise spatial covariance matrix estimate in the current frame, $$R_{t-1,f}^n$$

may be the noise spatial covariance matrix estimate in the previous frame, $$\Gamma_{t-1,f}^n$$

may be the weight for normalizing the noise spatial covariance matrix in the previous frame, $\tilde{\lambda}\lambda_{t,f}$ may be the re-estimated time-varying variance, $x_{t,f}$ may be the input vector, γ may be the forgetting factor, and $$\Gamma_{t,f}^n$$

may be the weight for normalizing the noise spatial covariance matrix in the current frame. The weight for normalizing the noise spatial covariance matrix in the current frame may be expressed according to [Equation 13] below.

$$\Gamma_{t,f}^n = \gamma\Gamma_{t-1,f}^n + 1/\tilde{\lambda}_{t,f} \quad \text{[Equation 13]}$$

Here, $$\Gamma_{t,f}^n$$

may be the weight for normalizing the noise spatial covariance matrix in the current frame, $$\Gamma_{t-1,f}^n$$

may be the weight for normalizing the noise spatial covariance matrix in the previous frame, and $\tilde{\lambda}_{t,f}$ may be the re-estimated time-varying variance. In addition, the target speech signal spatial covariance matrix estimate TGME may be expressed according to [Equation 14] below.

$$R^s_{t,f} = R^x_{t,f} - R^n_{t,f} \quad \text{[Equation 14]}$$

Here, $$R^s_{t,f}$$

may be the target speech signal spatial covariance matrix estimate, $$R^x_{t,f}$$

may be the spatial covariance matrix for the input vector, and $$R^n_{t,f}$$

may be the noise spatial covariance matrix estimate in the current frame. The estimated steering vector CSV may be calculated based on an eigen vector corresponding to a maximum eigen value of the target speech signal spatial covariance matrix estimate TGME, and may be calculated as [Equation 15] according to a power method.

$$\tilde{h}_{t,f} = h_{t-1,f} \quad \text{[Equation 15]}$$

$$\bar{h}_{t,f} = \frac{R^s_{t,f}\tilde{h}_{t,f}}{\|R^s_{t,f}\tilde{h}_{t,f}\|}$$

$$h_{t,f} = \bar{h}_{t,f}/\bar{h}^{(1)}_{t,f}$$

Here, $\tilde{h}_{t,f}$ may be the estimated steering vector of the previous frame, $\bar{h}_{t,f}$ may be an eigen vector corresponding to the maximum eigen value of the target speech signal spatial covariance matrix estimate, $$\bar{h}^{(1)}_{t,f}$$

may be a first component of $\bar{h}_{t,f}$, and $h_{t,f}$ may be the estimated steering vector.

The beamforming unit 300 may calculate the weight vector based on the speech existence probability SPP, the input vector X, and the estimated steering vector CSV to provide an output vector Y. In one embodiment, the weight vector may be determined according to the re-estimated time-varying variance calculated based on the target speech mask MSK. For example, the weight vector may be expressed as [Equation 16] and [Equation 17] below.

$$w_{t,f} = \frac{\Psi_{t,f}h_{t,f}}{h^H_{t,f}\Psi_{t,f}h_{t,f}} \quad Y_{t,f} = w^H_{t,f}x_{t,f} \quad \text{[Equation 16]}$$

Here, $w_{t,f}$ may be the weight vector, $Y_{t,f}$ may be the output vector, and $\Phi_{t,f}$ may be the variance-weighted spatial covariance inverse matrix.

In one embodiment, the variance-weighted spatial covariance inverse matrix may be determined according to the re-estimated time-varying variance calculated based on the target speech mask (MSK). The variance-weighted spatial covariance inverse matrix may be expressed as [Equation 17] below.

$$\Psi_{t,f} = \frac{1}{\gamma}\left(\Psi_{t-1,f} - \frac{P_{t,f}}{\gamma\tilde{\lambda}_{t,f} + Q_{t,f}}\right) \quad \text{[Equation 17]}$$

Here, $\tilde{\lambda}_{t,f}$ may be the re-estimated time-varying variance.

According to an embodiment, the time-varying dispersion may be determined according to the power of the output signal calculated based on the target speech mask MSK. For example, the time-varying variance may be expressed as [Equation 18] below.

$$\lambda_{t,f} = \beta\lambda_{t-1,f} + (1-\beta)|\bar{Y}_{t,f}|^2 \quad \text{[Equation 18]}$$

Here, $\Delta_{t-1,f}$ may be the time-varying variance in the previous frame, and $|\bar{Y}t,f|^2$ may be the power of the output signal. The power of the output signal may be expressed as [Equation 19].

$$|\bar{Y}_{t,f}|^2 = \frac{1}{2N_f+1}\sum_{r=k-N_f}^{k+N_f}|\mathcal{M}_{t,r}Y_{t,r}|^2 \quad \text{[Equation 19]}$$

Here, $Y_{t,r}$ may be the output vector and $M_{t,r}$ may be the target speech mask.

Figure 5:
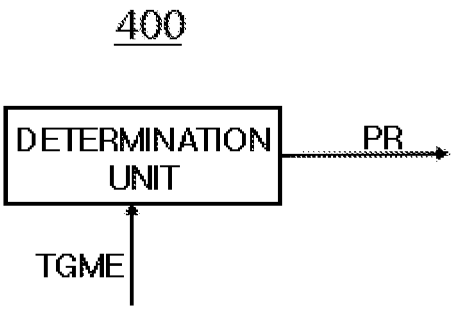
FIG. 5 is a diagram illustrating a determination unit included in the beamforming device of FIG. 2.

FIG. 5 is a diagram illustrating a determination unit included in the beamforming device of FIG. 2.

Referring to FIGS. 1 to 5, according to an embodiment, the beamforming device 10 may further include the determination unit 400. The determination unit 400 may determine whether the diagonal component of the target speech signal spatial covariance matrix estimate TGME is a negative number. According to an embodiment, when the diagonal component of the target speech signal spatial covariance matrix estimate TGME is the negative number, in the beamforming device 10 according to the present invention, the target speech mask MSK of the current frame may be the same as the target speech mask MSK of the previous frame, and the estimated steering vector CSV of the current frame may be the same as the estimated steering vector CSV of the previous frame.

Figure 8:
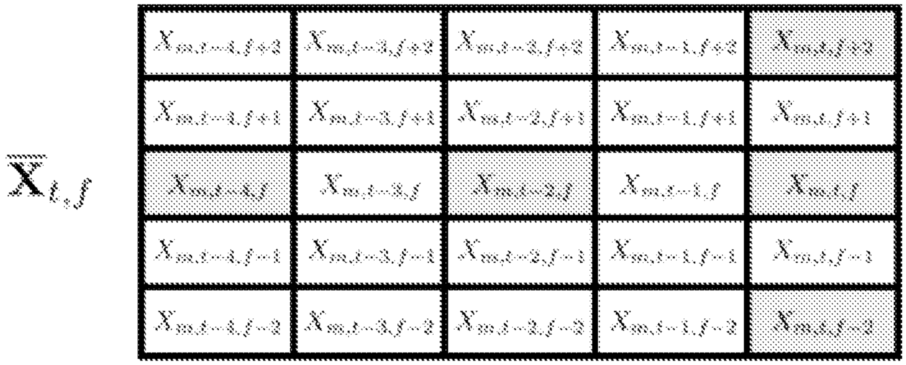

FIGS. 6 to 8 are diagrams for describing an input vector in a single channel applied to the beamforming device of FIG. 2.

Referring to FIGS. 1 to 8, according to an embodiment, when the beamforming device 10 operates in a single channel, the input vector X is configured by changing the frame and frequency based on the current frame and reference frequency. For example, the current frame may be t and the reference frequency may be f. In this case, in the input vector X, corresponding values for the same frame may be arranged by moving a frequency up and down step by step based on $X_{m,t,f}$, and values corresponding to previous frames may be arranged by changing only the frame at the same frequency on the left based on $X_{m,t,f}$. Here, the single channel may mean that there is only one target sound source.

According to an embodiment, the input vector X may be composed of a portion of the input vector X. For example, in the input vector X, only the frame may be configured differently based on the same frequency f, or only the frequency may be configured differently at the same frame t. In addition, as illustrated in FIG. 8, the input vector X may not only be configured by extracting the frame or frequency every one step, but may also be configured in various ways.

According to the beamforming device 10 of the present invention, it is possible to more accurately extract the target speech signal TTS from the input signal by estimating the speech existence probability SPP corresponding to the probability that the target speech signal TSS exists based on the input vector X to provide the steering vector and the weight vector.

According to the present invention as described above, there are the following effects.

According to the beamforming device of the present invention, it is possible to more accurately extract the target speech signal from the input signal by estimating the speech existence probability corresponding to the probability that the target speech signal exists based on the input vector to provide the steering vector and the weight vector.

In addition, other features and advantages of the present invention may be newly understood through the embodiments of the present invention.

What is claimed is:

1. A beamforming device, comprising:

a probability estimation unit that estimates a speech existence probability corresponding to a probability that a target speech signal exists based on an input vector;

a steering vector unit that provides an estimated steering vector according to the speech existence probability and the input vector; and a beamforming unit that calculates a weight vector based on the speech existence probability, the input vector, and the estimated steering vector to provide an output vector, wherein wherein the speech existence probability is determined according to a target speech signal spatial covariance matrix for the target speech signal included in the input vector;

the target speech signal spatial covariance matrix for the target speech signal included in the input vector is calculated according to a noise spatial covariance matrix;

the noise spatial covariance matrix for the noise included in the input vector is calculated according to a noise spatial covariance matrix estimate of a previous frame corresponding to the previous frame of a current frame; and when the beamforming device operates in a single channel, the input vector is configured by changing the frame and frequency based on the current frame and a reference frequency.

2. The beamforming device of claim 1, wherein a noise spatial covariance inverse matrix for the noise included in the input vector is calculated according to a variance-weighted spatial covariance inverse matrix in the previous frame.

3. The beamforming device of claim 1, wherein an estimated time-varying variance included in the noise spatial covariance inverse matrix is calculated by weighted-averaging a time-varying variance in the previous frame.

4. The beamforming device of claim 1, further comprising:

a probability providing unit that provides the speech existence probability based on the target speech signal spatial covariance matrix.

5. The beamforming device of claim 1, further comprising:

a mask unit that provides a target speech mask according to the speech existence probability.

6. The beamforming device of claim 1, wherein the estimated steering vector is determined according to a re-estimated time-varying variance calculated based on the target speech mask.

7. The beamforming device of claim 6, wherein the weight vector is determined according to the re-estimated time-varying variance calculated based on the target speech mask.

8. The beamforming device of claim 7, wherein the time-varying variance is determined according to power of an output signal calculated based on the target speech mask.

9. The beamforming device of claim 2, wherein the variance-weighted spatial covariance inverse matrix is determined according to the re-estimated time-varying variance calculated based on the target speech mask.

10. The beamforming device of claim 1, further comprising:

a determination unit that determines whether a diagonal component of the target speech signal spatial covariance matrix is a negative number.

11. The beamforming device of claim 1, wherein when the diagonal component of the target speech signal spatial covariance matrix is the negative number, the target speech mask of the current frame is the same as the target speech mask of the previous frame, and the estimated steering vector of the current frame is the same as the estimated steering vector of the previous frame.

12. The beamforming device of claim 1, wherein the input vector is composed of a portion of the input vector.

* * * * *